US010843390B2

(12) United States Patent
Butz

(10) Patent No.: US 10,843,390 B2
(45) Date of Patent: Nov. 24, 2020

(54) METHOD AND DEVICE FOR MANUFACTURING AN INTERDENTAL CLEANER

(71) Applicant: SUNSTAR SUISSE SA, Etoy (CH)

(72) Inventor: Jürgen Butz, Schönau (DE)

(73) Assignee: SUNSTAR SUISSE SA, Etoy (CH)

( * ) Notice: Subject to any disclaimer, the term of this patent is extended or adjusted under 35 U.S.C. 154(b) by 432 days.

(21) Appl. No.: 15/528,920

(22) PCT Filed: Nov. 18, 2015

(86) PCT No.: PCT/EP2015/002299
§ 371 (c)(1),
(2) Date: May 23, 2017

(87) PCT Pub. No.: WO2016/082921
PCT Pub. Date: Jun. 2, 2016

(65) Prior Publication Data
US 2017/0318948 A1 Nov. 9, 2017

(30) Foreign Application Priority Data
Nov. 24, 2014 (DE) .................. 10 2014 017 257

(51) Int. Cl.
B29C 45/14 (2006.01)
A46B 1/00 (2006.01)
(Continued)

(52) U.S. Cl.
CPC .......... B29C 45/14065 (2013.01); A46B 1/00 (2013.01); A46B 3/005 (2013.01);
(Continued)

(58) Field of Classification Search
CPC ..... A46B 1/00; A46B 3/005; A46B 2200/108; B29C 2045/14139; B29C 45/14065; B29C 45/0081
See application file for complete search history.

(56) References Cited

U.S. PATENT DOCUMENTS 2,457,440 A * 12/1948 Booth .................. B29C 70/58
264/138
3,843,297 A * 10/1974 Espinosa .............. A61C 15/041
425/289

(Continued)

FOREIGN PATENT DOCUMENTS

CN 101569561 A 11/2009
DE 19956338 A1 * 5/2001 .............. B60J 10/18
(Continued)

Primary Examiner — Atul P. Khare
(74) Attorney, Agent, or Firm — McGlew and Tuttle, P.C.

(57) ABSTRACT

A method for manufacturing an interdental cleaner includes providing a rod-shaped carrier made of plastic, into which laterally protruding bristles are embedded. In this case, a filament array formed of a plurality of filament strands is inserted into a holding cassette and is fixed in a predefined alignment in the holding cassette by means of a holding device. The holding cassette is then inserted into an injection-molding device and the filament array is coated with plastic in the injection-molding device, forming a plurality of rod-shaped carriers arranged spaced apart next to one another. Finally, the filament strands forming the filament array are separated at least in the sections located between adjacent rod-shaped carriers. In addition, a device for carrying out the method is provided.

19 Claims, 19 Drawing Sheets

(51) Int. Cl.
　　　*A46B 3/00*　　　(2006.01)
　　　*A46D 3/04*　　　(2006.01)
　　　*A46B 3/04*　　　(2006.01)
　　　*B29C 45/00*　　(2006.01)
　　　*A46B 9/06*　　　(2006.01)
　　　*A46B 9/02*　　　(2006.01)
　　　*A46B 9/04*　　　(2006.01)

(52) U.S. Cl.
　　　CPC ............... *A46B 3/04* (2013.01); *A46B 9/026* (2013.01); *A46B 9/04* (2013.01); *A46B 9/06* (2013.01); *A46D 3/04* (2013.01); *B29C 45/0081* (2013.01); *A46B 2200/108* (2013.01); *B29C 2045/14139* (2013.01)

(56) References Cited

U.S. PATENT DOCUMENTS

| | | | | |
|---|---|---|---|---|
| 3,926,201 | A * | 12/1975 | Katz | A61C 15/046 132/323 |
| 4,006,750 | A | 2/1977 | Chodorow | |
| 4,233,260 | A * | 11/1980 | d'Argembeau | A46B 3/00 264/157 |
| 5,044,041 | A * | 9/1991 | Ljungberg | A46B 3/04 132/321 |
| 5,086,792 | A * | 2/1992 | Chodorow | A61C 15/043 132/323 |
| 6,158,444 | A * | 12/2000 | Weihrauch | A61C 15/02 132/200 |
| 6,544,457 | B1 * | 4/2003 | Rieser | A61C 15/043 264/229 |
| 9,642,682 | B2 * | 5/2017 | Kato | A61C 15/02 |
| 9,968,426 | B2 * | 5/2018 | Butz | A61C 15/02 |
| 2009/0230756 | A1 * | 9/2009 | Crossman | A46B 5/02 300/21 |
| 2014/0008837 | A1 | 1/2014 | Eatherton | |
| 2015/0282601 | A1 * | 10/2015 | Butz | A46B 1/00 15/167.1 |
| 2015/0335141 | A1 * | 11/2015 | Schar | A46B 1/00 15/106 |
| 2017/0216002 | A1 * | 8/2017 | Butz | A46B 1/00 |

FOREIGN PATENT DOCUMENTS

| | | |
|---|---|---|
| DE | 10 2005 008289 A1 | 10/2006 |
| DE | 10 2012 015 663 A1 | 5/2014 |
| EP | 0 932 371 B1 | 12/2001 |
| EP | 2 100 570 A1 | 9/2009 |
| EP | 2 324 796 A1 | 5/2011 |
| JP | 2006-141689 A | 6/2006 |
| JP | 2006 212136 A | 8/2006 |
| JP | 2006212136 A * | 8/2006 |
| WO | 2014/023395 A1 | 2/2014 |

* cited by examiner

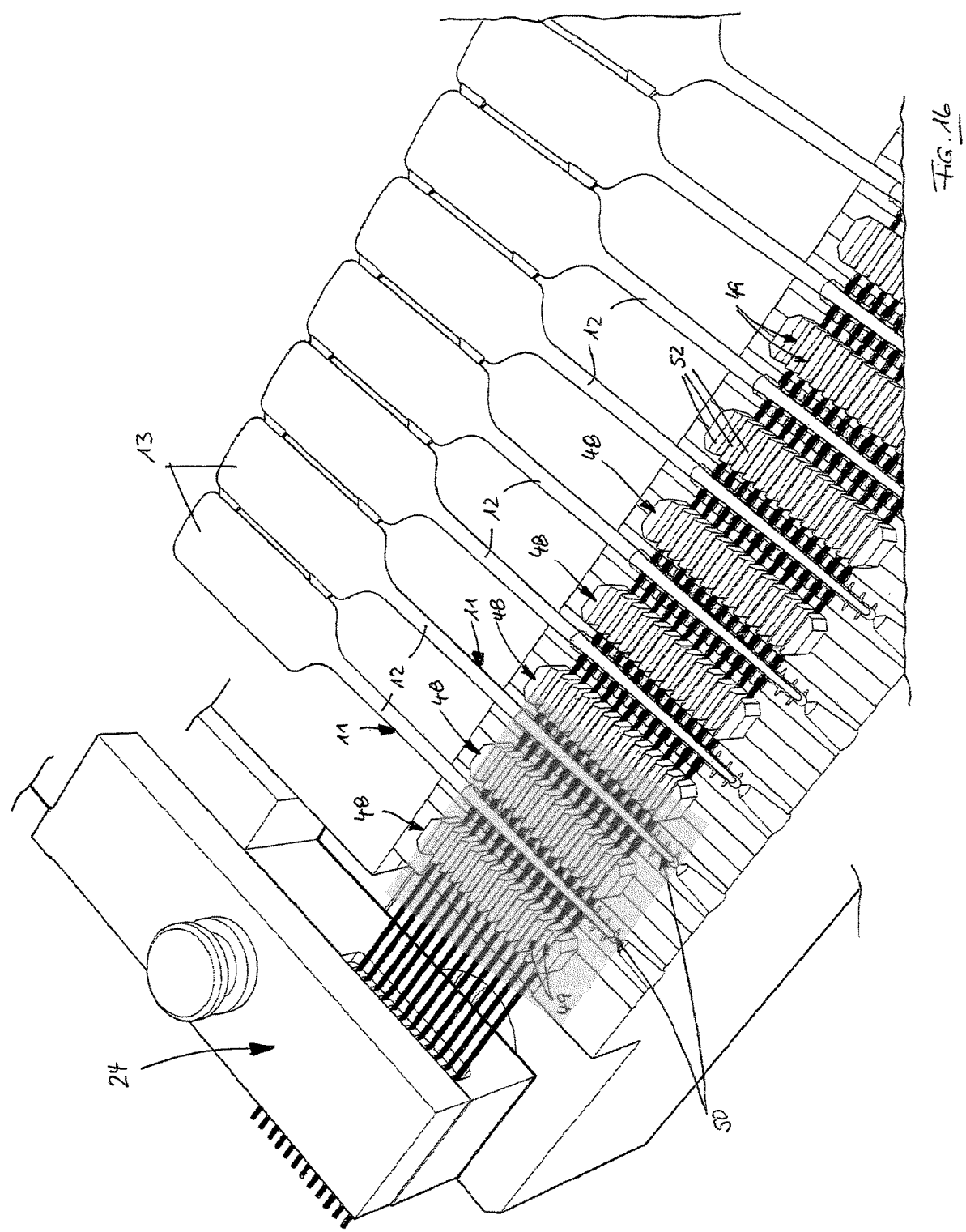

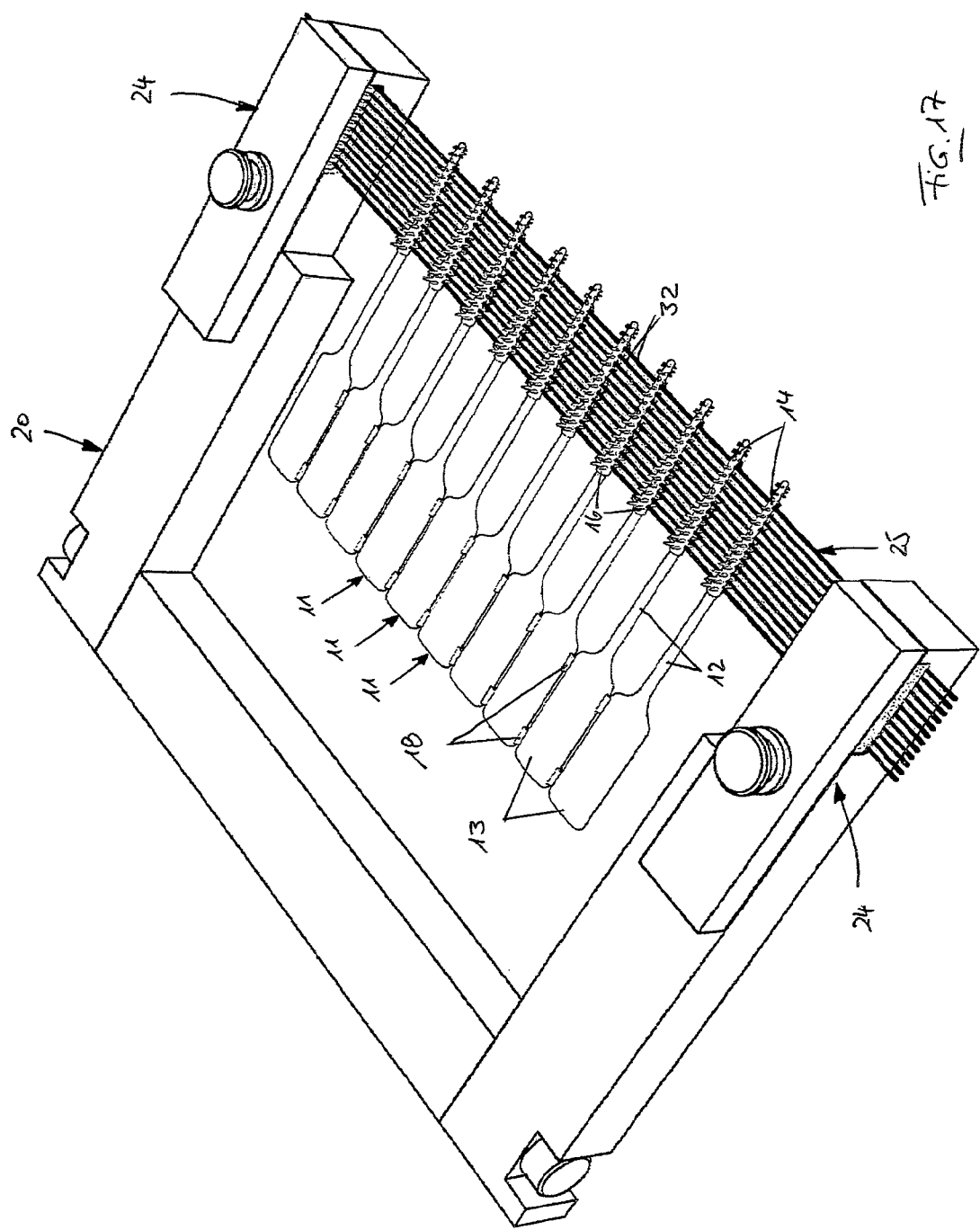

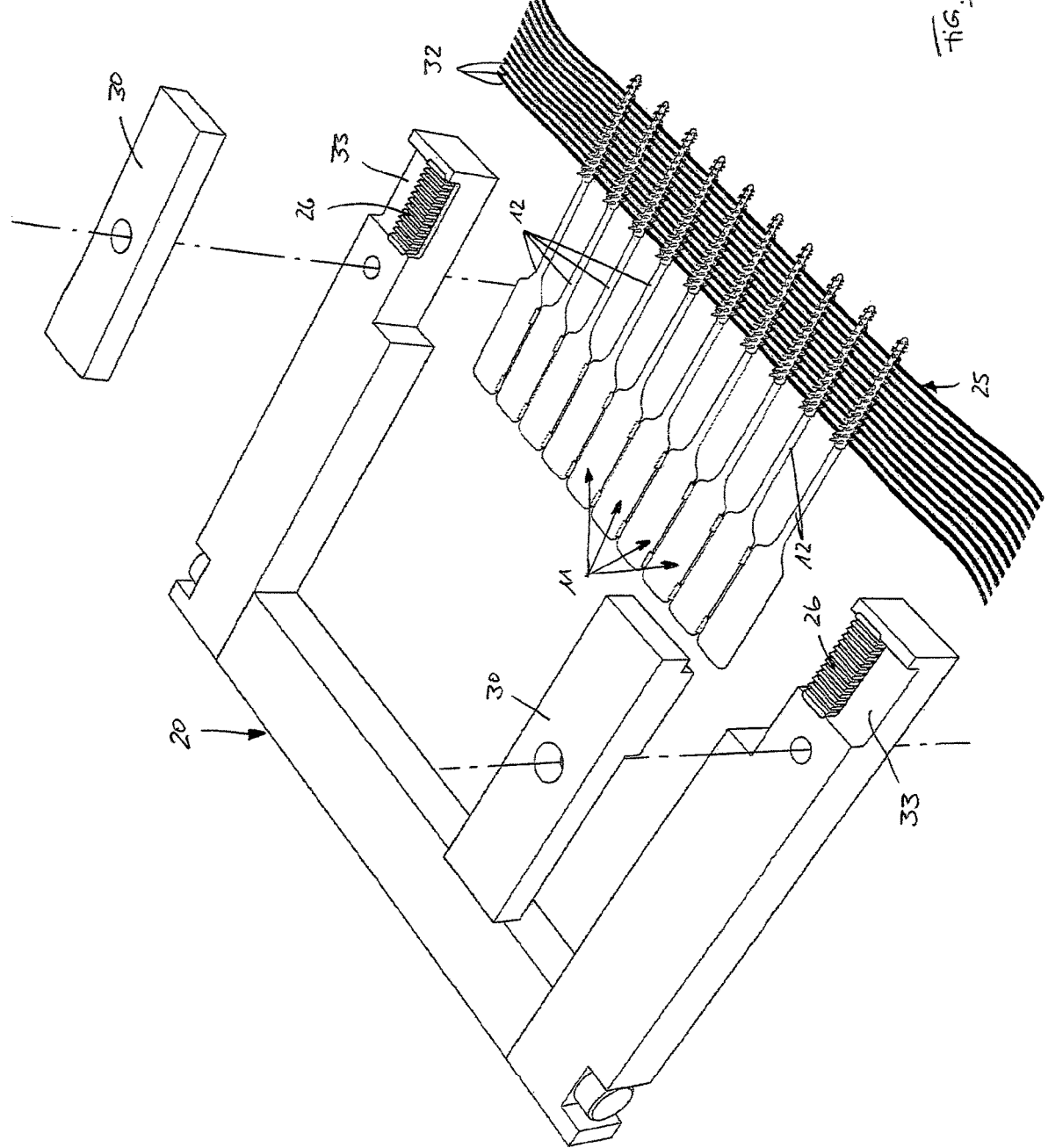

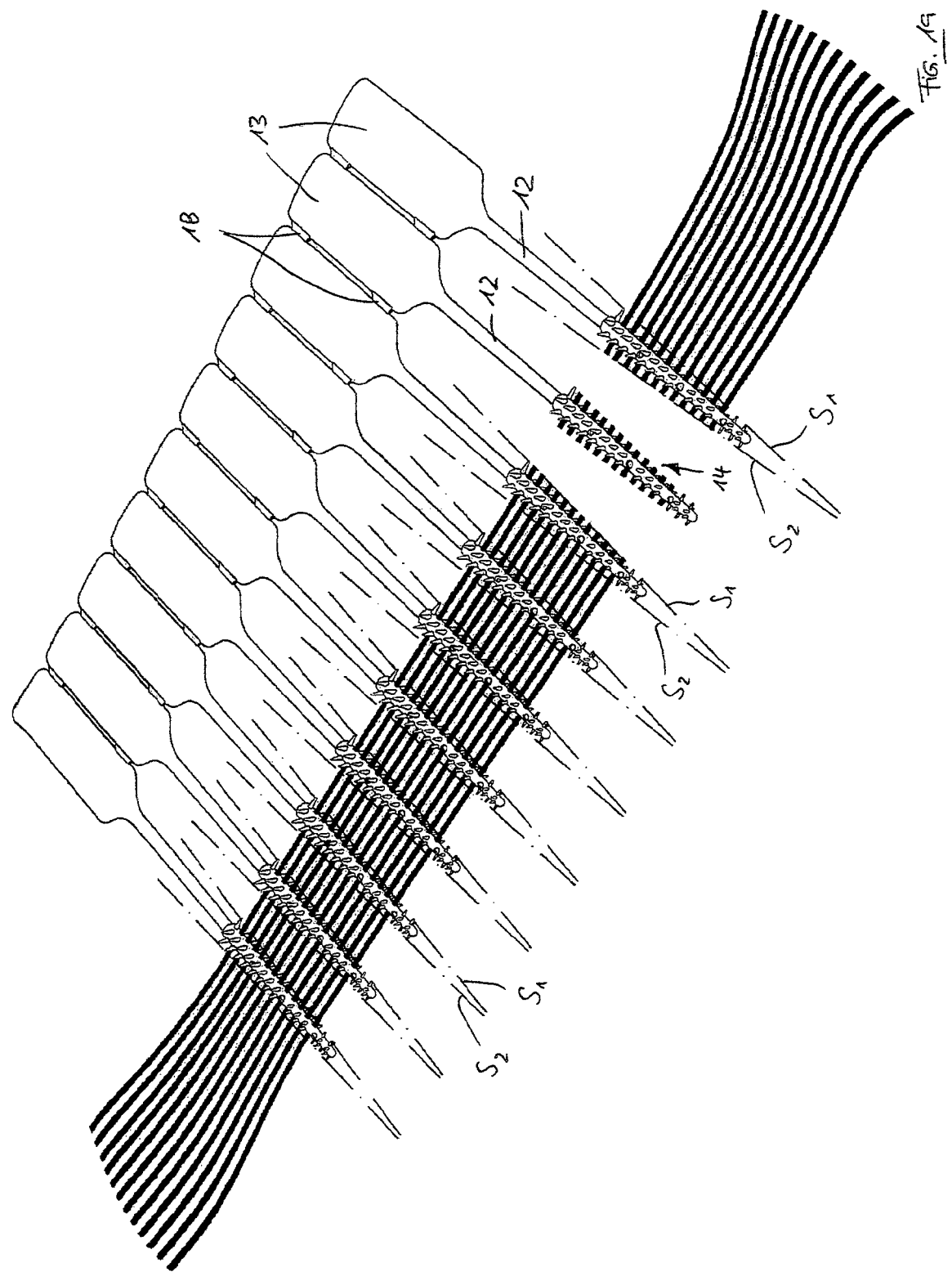

METHOD AND DEVICE FOR MANUFACTURING AN INTERDENTAL CLEANER

CROSS REFERENCE TO RELATED APPLICATIONS

This application is a United States National Phase Application of International Application PCT/EP2015/002299, filed Nov. 18, 2015, and claims the benefit of priority under 35 U.S.C. § 119 of German Application 10 2014 017 257.0, filed Nov. 24, 2014, the entire contents of which are incorporated herein by reference.

FIELD OF THE INVENTION

The present invention pertains to a method for manufacturing an interdental cleaner that comprises a rod-shaped carrier made of plastic, into which laterally protruding bristles are embedded. In addition, the present invention pertains to a device for manufacturing a corresponding interdental cleaner.

BACKGROUND OF THE INVENTION

A corresponding interdental cleaner is frequently also called a toothpick and is known, for example, in EP 0 932 371 B 1. The interdental cleaner described there has a rod-shaped carrier which is made of an inherently stable plastic and which has a grip part at its one end and a cleaning device in the form of a cover of the carrier at its axially opposite end. The cover consists of a soft elastic plastic, for example, a thermoplastic elastomer, and is molded onto the carrier. The cover has a structuring in the form of nubs or fingers extending radially outwards on its outside. For cleaning interdental spaces, a user grips the interdental cleaner at the grip part and inserts the rod-shaped carrier with the end carrying the cover into an interdental space and moves the interdental cleaner back and forth in the axial direction, as a result of which the interdental space is cleaned and particles which may be present are dislodged.

It was found that a good cleaning of interdental spaces is possible with an interdental cleaner of the configuration mentioned, but it is difficult to remove contaminants or residues from very narrow, fine pockets of the teeth. An interdental cleaner, the cleaning device of which has a bristle border consisting of a plurality of bristle bundles protruding with radial components from the cover and/or single bristles, is hence proposed in DE 10 2012 015 663 A1. Here, the cleaning device may consist of the bristle border alone; however, it is also possible to provide the soft elastic cover of the configuration mentioned in addition to the bristle border.

Because the dimensions of the interdental cleaner are relatively small, it proved to be difficult and technically very complicated to align and hold the bristles correctly during the manufacture of the interdental cleaner in an injection-molding device, so that they do not shift out of place or are not displaced when the plastic material is injected.

SUMMARY OF THE INVENTION

A basic object of the present invention is to create a method for manufacturing an interdental cleaner of the configuration mentioned, with which a bristle border of the interdental cleaner can be positioned and fixed in a simple and reliable manner during the manufacture thereof. In addition, a device for manufacturing a corresponding interdental cleaner, with which the method can be carried out in a simple manner, shall be created.

In terms of the method, said object is accomplished by a method with which provisions are made for a filament array consisting of a plurality of filament strands to be inserted into a holding cassette and to be fixed in a predefined alignment in the holding cassette by means of at least one holding device. The holding cassette is subsequently inserted into an injection-molding device and the filament array in the injection-molding device is coated with plastic, forming a plurality of rod-shaped carriers arranged spaced apart next to one another. Finally, the filament strands forming the filament array are separated at least in the sections located between adjacent rod-shaped carriers, as a result of which the rod-shaped carriers and thus the interdental cleaner are released from the filament array or said array is broken up.

The present invention is based on the fundamental consideration to form a plurality of interdental cleaners simultaneously and not to align the filaments or bristles of each individual interdental cleaner for this, but to use a filament array consisting of a plurality of longer filament strands, which are arranged preferably parallel to one another and spaced apart next to one another. The precise positioning and fixing of the filament array and of the filament strands is considerably simpler, more certain and more precise compared to the handling of very short bristle blanks. The filament strands connecting the individual interdental cleaners to one another are cut and separated only when the interdental cleaners are finished, so that a bristle border protruding radially or at least with radial components outwards is formed at each individual interdental cleaner.

A holding cassette, which can be fitted with the filament array and the filament strands away from the injection-molding device, is provided for fixing the filament array. Provisions can be made in this case for each filament strand to be inserted into a guiding part of the holding cassette in at least two spaced-apart areas of its axial length and to be fixed such that it is freely clamped between the guiding parts. The guiding parts ensure that the filament strands have a precise position and especially a precise mutual alignment.

In a variant of the present invention, provisions may be made for the guiding parts to have each a plurality of guide slots, wherein each filament strand is inserted into one of the guide slots and is positioned precisely by same.

The holding cassette fitted with the filament array or filament strands is inserted into the injection-molding device and coated there with plastic material, which forms a plurality of rod-shaped carriers arranged spaced apart next to one another. After the injection-molding device is opened, the filament array is, furthermore, clamped in the holding cassette, wherein a plurality of independent rod-shaped carriers arranged next to one another, which preferably run at right angles to the longitudinal extension of the filament strands, are now mounted at the filament array.

A filament strand may be composed, for example, of a monofilament, i.e., a single plastic thread, or of a bundle of monofilaments, i.e., a plurality of plastic threads located next to one another. As an alternative, it is also possible for a filament strand to be composed of a multifilament which consists of a plurality of monofilaments running next to one another, which are connected to one another or are located next to one another. The individual filaments may run linearly or parallel to one another or even be rotated or twisted or textured here. As an alternative or in addition thereto, provisions may be made for the individual filaments of a filament strand to have different diameters and/or to consist of different materials. However, it is also possible that the individual filaments within a filament strand have a similar configuration, but differ from the filaments of an adjacent filament strand in terms of diameter and/or material.

When the individual filament strands of the filament array are each inserted into one of the guiding parts and fixed in at least two spaced-apart areas and preferably in their end areas of their axial length, they extend between the guiding parts linearly and under tension. In the unstressed state, this ensures a precise mutual positioning of the filament strands. However, when the filament strands are relatively long and when the plastic material forming the rod-shaped carriers is inserted into the corresponding cavity of the injection-molding device under high pressure, it may happen that the filament strands become displaced relative to one another, as a result of which a precise positioning would no longer be guaranteed. In a preferred embodiment of the present invention, provisions may therefore be made for each filament strand of the filament array to be inserted into a plurality of first positioning parts, which are spaced apart from one another and are formed at the injection-molding device when the holding cassette is inserted into the injection-molding device. The first positioning parts may have, for example, a plurality of first positioning slots, wherein each filament strand is inserted into one of the first positioning slots of the first positioning parts preferably with a tight fit. In this way, the filament strands are also guided precisely and positioned relative to one another at a plurality of points of their sections loosely clamped between the guiding parts of the holding cassette, so that an unintended displacement as a result of external influences or as a result of the injection pressure of the plastic material forming the rod-shaped carriers is reliably avoided.

A simple and reliable insertion of the filament strands into the first positioning slots of the first positioning parts can be achieved when the top sides of the first positioning parts are arranged offset in terms of height in relation to one another in the insertion direction, so that the filament strands are not simultaneously inserted into all their first positioning slots when the holding cassette is inserted or lowered, but rather a lateral offset is given.

Provisions are made for the rod-shaped carrier to have a preferably plate-shaped grip section at its end facing away from the bristles in a variant of the present invention. Each rod-shaped carrier may always be configured as an individual carrier independent of the other rod-shaped carriers; however, provisions are preferably made for adjacent rod-shaped carriers to be connected to one another in one piece at their grip sections. This can occur, for example, by adjacent rod-shaped carriers being connected to one another at their grip sections via webs that can be broken off. When the filament array clamped into the holding cassette with the rod-shaped carriers molded on is removed from the injection-molding device, the rod-shaped carriers are connected in one piece to the filament array or the filament strands at their front end facing away from the grip section and protrude freely at right angles to same. When the rod-shaped carriers are additionally connected to one another at their grip sections in said manner, an additional fixing and mutual support of the rod-shaped carriers is given, so that, on the one hand, one of the rod-shaped carriers is prevented from buckling out or breaking off because of an isolated external load, or otherwise relative displacements between the rod-shaped carriers are prevented from occurring. The rod-shaped carriers are thus held in a predefined relative position, which is especially advantageous if the holding cassette is fed to an additional work station after removal from the injection-molding device, in which work station for example, an additional plastic component can be molded on or in which a cutting of the interdental cleaner takes place.

For molding on an additional plastic component, provisions may be made according to the present invention for the holding cassette with the filament array carrying the rod-shaped carriers to be transferred either to the injection-molding device, in which the rod-shaped carriers were molded on, or to be inserted into an additional injection-molding machine. In this case, the rod-shaped carriers are preferably coated in the area of the filament array in at least some areas with a soft elastic plastic, for example, a thermoplastic elastomer or silicone, forming a cover. A corresponding cover may enclose in a sleeve-like manner, for example, the front end of the rod-shaped carrier, which end is facing away from the grip section, and may have radially protruding projections or fingers on the outside.

Each filament strand of the filament array shall be positioned with certainty as well when the soft elastic plastic material is injected to form the cover. This can be achieved, for example, by each filament strand of the filament array being inserted into a plurality of second positioning parts that are spaced apart from one another and are formed at the injection-molding device or the additional injection-molding device when the holding cassette is inserted or transferred.

Provisions may be made in this case for each second positioning part to have a plurality of second positioning slots, wherein each filament strand is preferably inserted with a tight fit into one of the second positioning slots of the second positioning parts.

After the end of the injection operations, an array of a plurality of rod-shaped carriers arranged next to one another with or without a cover, which are still connected to one another via the filament strands, is formed. In a cutting operation, the filament strands forming the filament array are cut and separated at least in the sections located between adjacent rod-shaped carriers and preferably also in their end areas. The separation of the filament strands may take place here directly in the holding cassette, i.e., as long as the filament strands are still fixed in the holding cassette. As an alternative, it is, however, also possible that the filament array carrying the rod-shaped carriers is removed from the holding cassette before the separation of the filament strands and the cutting operation is carried out in a separate work station. The empty holding cassette can then be fitted with new filament strands.

Each rod-shaped carrier is preferably removed from the filament array by two cuts, which run, for example, at a short distance parallel to its outer contour or the outer contour of the cover, so that a bristle border protruding radially outwards is formed at the rod-shaped carrier.

A device for manufacturing a corresponding interdental cleaner comprises according to the present invention an injection-molding device, which has at least one cavity for the formation of a plurality of rod-shaped carriers arranged next to one another and a holding device for a filament array composed of a plurality of filament strands. The holding device here has a holding cassette with at least two guiding parts spaced apart from one another, into which the filament strands can be inserted, wherein the filament strands can be fixed in the holding device such that they can be clamped loosely between the guiding parts. The holding cassette can be inserted into the injection-molding device and can be removed and/or can be transferred from same.

The filament array composed of a plurality of filament strands can be inserted into the holding cassette and fixed in same outside of the injection-molding device. In this case, the guiding parts ensure that the filament strands are positioned in a predefined alignment. For this purpose, the guiding parts may have a plurality of guide slots, wherein each guide slot may be configured for receiving precisely one filament strand.

The filament strands are preferably fixed in the holding cassette by means of a clamping part, which fixes the filament strands in the holding cassette in a clamping manner and thus in a non-positive manner.

In a possible embodiment of the present invention, provisions may be made for the holding cassette to be configured as a frame. In this case, the frame may have a, for example, C-shaped or E-shaped configuration. In the case of a C-shaped frame, this frame has a base and two legs protruding from it, wherein the filament strands preferably run parallel to the base between the free ends of the legs and are clamped. If the frame has an E-shaped configuration, there is an additional middle leg, so that an additional middle support is present for the filament strands.

In addition to the guiding and alignment of the filament strands in the holding cassette, the filament strands may also be positioned and guided in the injection-molding device when the holding cassette is inserted into the injection-molding device. For this purpose, a plurality of first positioning parts, which are spaced apart from one another, may be provided in the injection-molding device. Each first positioning part preferably has a plurality of first positioning slots, which are arranged next to one another, wherein each first positioning slot may be configured for receiving precisely one filament strand.

In the injection-molding device, a plurality of rod-shaped carriers made of a plastic material, which preferably run parallel to one another, are molded onto the filament array or the filament strands. For this purpose, the injection-molding device has a cavity with a plurality of cavity sections for forming each a rod-shaped carrier. Provisions may be made here for at least one first positioning part to always be provided between two adjacent cavity sections for positioning the filament strands.

In order to facilitate the insertion of the filament strands into the first positioning parts, provisions may be made in a variant of the present invention for at least some of the first positioning parts to have a different height, wherein the height is measured in the direction of insertion of the filament strands. As a result, the filament strands do not all simultaneously mesh with the first positioning slots associated with them when the holding cassette is inserted or lowered into the injection-molding device, but rather the filament strands are first inserted into the first positioning slots of those first positioning parts that have the greatest height. As a result, they are already additionally guided in case of another lowering or insertion operation until they also mesh with the first positioning slots of those first positioning parts that have the second greatest height. Due to this offset in time of the insertion of the filament strands into the positioning parts, a reliable insertion of the filament strands into the first positioning parts is guaranteed even at a high rate of motion of the holding cassette.

In a preferred variant of the present invention, provisions may be made for each cavity section that is used to form a rod-shaped carrier to have lateral depressions for receiving a filament strand each. The depressions ensure that the filament strands are additionally guided into the area that is directly adjacent to the rod-shaped carrier and that the filament strands are not clamped or damaged during the closing of the mold. An undefined bundle form, as is present in the area of the first positioning slots, is deflected into a defined bundle form in the depressions.

The depressions have a breadth B (measured in the longitudinal direction of the rod-shaped carrier) that is greater than a width W of the first positioning slots of the first positioning parts. This leads to the filament strands being grasped in their area located in the first positioning slot more tightly and higher than in the area that is located in the depressions of the cavity. This offers the advantage that the degree of filling of the filaments or filament strands in the depressions is very high, which is necessary to obtain a seal between the filaments and the injected plastic. In this way, overinjection into the filament area can be prevented. In addition, a clamping, pinching or damage of the filament strands in the closed state of the injection-molding device is prevented.

In one possible embodiment, provisions may be made to overinject the rod-shaped carrier of the interdental cleaner with a cover made of a soft elastic plastic in the manner described at least in its front area in an additional method step. For this purpose, provisions may be made for the injection-molding device or an additional injection-molding device to have a coating cavity, in which the rod-shaped carriers can be coated with the soft elastic plastic in the area of the filament array in at least some areas. The coating cavity preferably has a plurality of cavity sections for forming a cover each and a plurality of second positioning parts, spaced apart from one another, are provided, with which the filament strands are positioned and held, when the holding cassette with the filament array and the molded-on rod-shaped carriers is inserted into the coating cavity.

The second positioning parts may also have a plurality of second positioning slots arranged next to one another, wherein each second positioning slot may be configured for receiving precisely one filament strand.

The second positioning parts should be arranged distributed spaced apart in the longitudinal direction of the filament strands. In a preferred embodiment of the present invention, provisions are made for a second positioning part to always be provided between two adjacent cavity sections of the coating cavity.

To facilitate the insertion of the filament strands into the second positioning parts, provisions may be made in a variant of the present invention for at least some of the second positioning parts to have a different height, wherein the height is measured in the direction of insertion of the filament strands. As a result, the filament strands do not all simultaneously mesh with the second positioning slots associated with them when the holding cassette is inserted or lowered into the injection-molding device, but rather the filament strands are first inserted into the second positioning slots of those second positioning parts that have the greatest height. As a result, they are already additionally guided in case of a further lowering or insertion operation until they also mesh with the second positioning slots of those second positioning parts that have the second greatest height. Due to this offset in time of the insertion of the filament strands into the positioning parts, a reliable insertion of the filament strands into the second positioning parts is guaranteed even at a high rate of motion of the holding cassette.

After the rod-shaped carriers were molded onto the filament array and were optionally provided with a cover in a subsequent step, the rod-shaped carriers must be removed from the filament array. For this purpose, a cutting device may be provided according to the present invention, by means of which the rod-shaped carriers can be cut out of the filament array.

Further details and features of the present invention shall appear from the following description of exemplary embodiments with reference to the drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 16 is a perspective view of a coating cavity with inserted holding cassette and second positioning parts;

FIG. 17 is a perspective view of a holding cassette with completely molded interdental cleaner;

FIG. 18 shows the holding cassette according to FIG. 13 in the open position; and FIG. 19 is a schematic view of the trimming of the filament strands.

DESCRIPTION OF THE PREFERRED EMBODIMENTS

Figure 1:
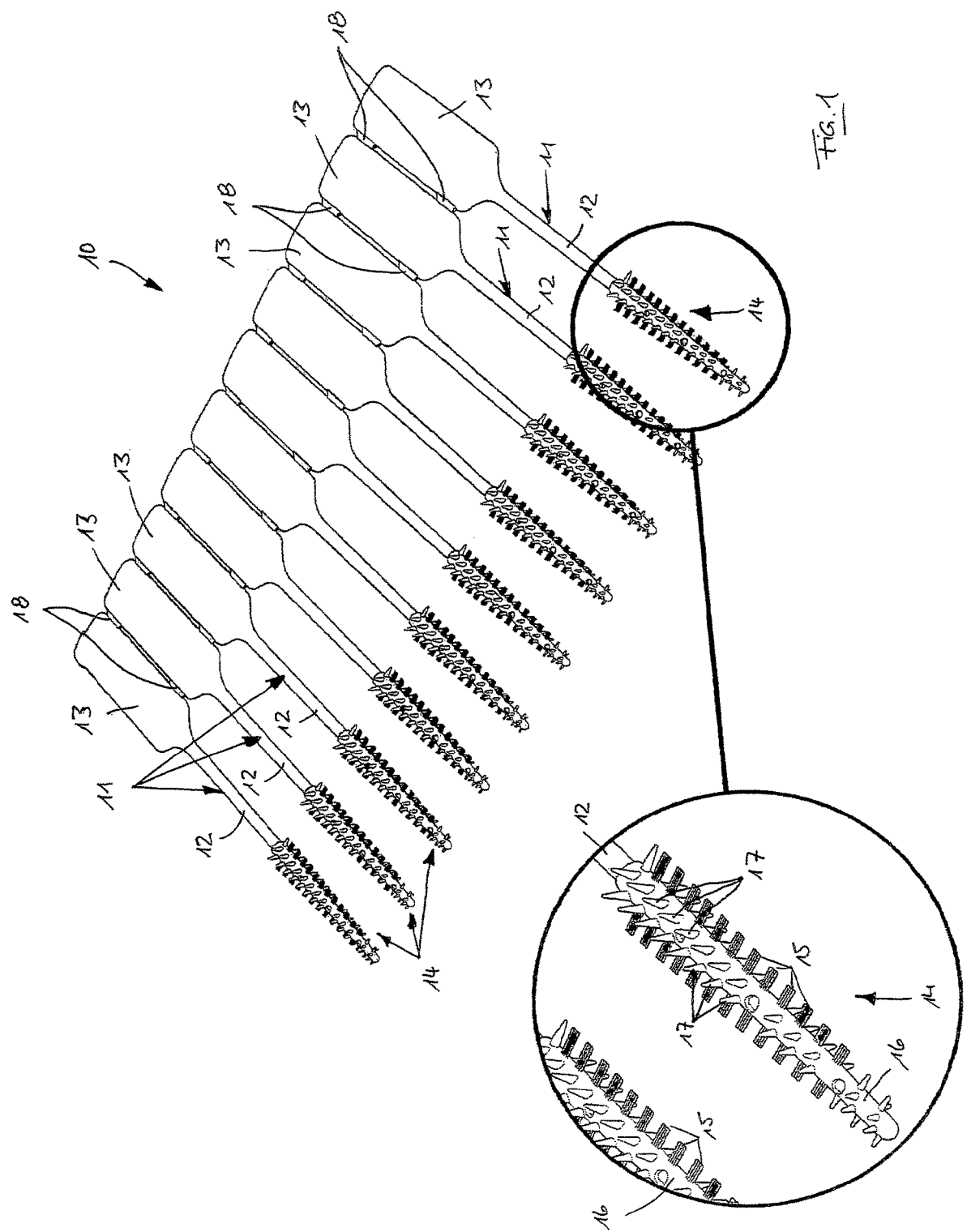
FIG. 1 is a perspective view of a set of interdental cleaners with an enlarged view of a cleaning section.

Referring to the drawings, FIG. 1 shows a set 10 of interdental cleaners 11 arranged next to one another, wherein the set 10 according to FIG. 1 comprises, for example, ten interdental cleaners 11. Each interdental cleaner 11 consists of plastic and has a rod-shaped carrier 12, at the rear (right according to FIG. 1) end of which a plate-shaped grip section 13 is formed and molded integrally. A cleaning section 14, which can be seen on the left side of FIG. 1 in an enlarged view, is arranged on the rod-shaped carrier 12 at the front end located axially opposite the grip section 13. The cleaning section 14 has a cover 16 made of a soft elastic plastic, which has a radially protruding structuring in the form of fingers 17 or nubs on its outside.

Bristles 15, which protrude in a stub-like manner radially in a freely protruding manner on opposite sides, are embedded into the material of the rod-shaped carrier 12.

The interdental cleaners 11, which are arranged next to one another, are connected to one another in their respective grip sections 13 via one-piece webs 18, which can be broken off and are molded integrally, so that the strip-like, connected set 10 is formed and the user can remove each interdental cleaner 11 by breaking off the corresponding webs 18.

How the set 10 of interdental cleaners 11 shown in FIG. 1 is manufactured is described below. A holding cassette 20, which is shown in FIGS. 2 through 5, is provided for this purpose. The holding cassette 20 is configured as a U-shaped frame 21 and has a base 23 as well as two freely protruding legs 22, extending at right angles thereto. At the outer ends of the leg 22 facing away from the base 23 is arranged a holding device 24, by means of which a filament array 25, which consists of a plurality of filament strands 32 arranged spaced apart parallel to one another, can be positioned and fixed. As FIG. 5 shows, each filament strand 32 can be formed either as a bundle 32a of a plurality of straight filaments running parallel to one another or by a corresponding bundle 32c rotated about its longitudinal axis or even by non-parallel monofilaments located next to one another in the form of a textured bundle 32b.

Figure 2:
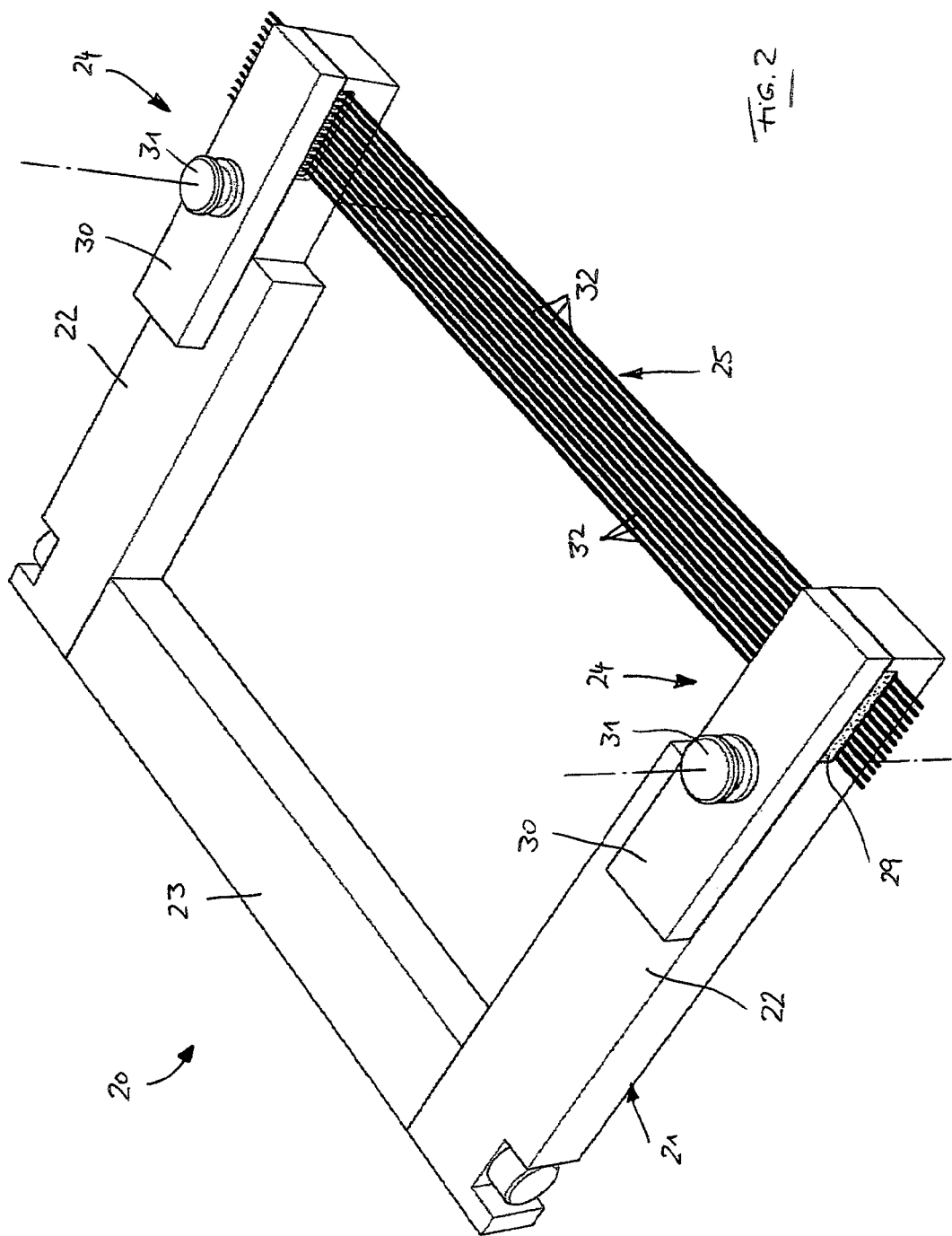
FIG. 2 is a perspective view of a holding cassette with inserted filament array.
Figure 3:
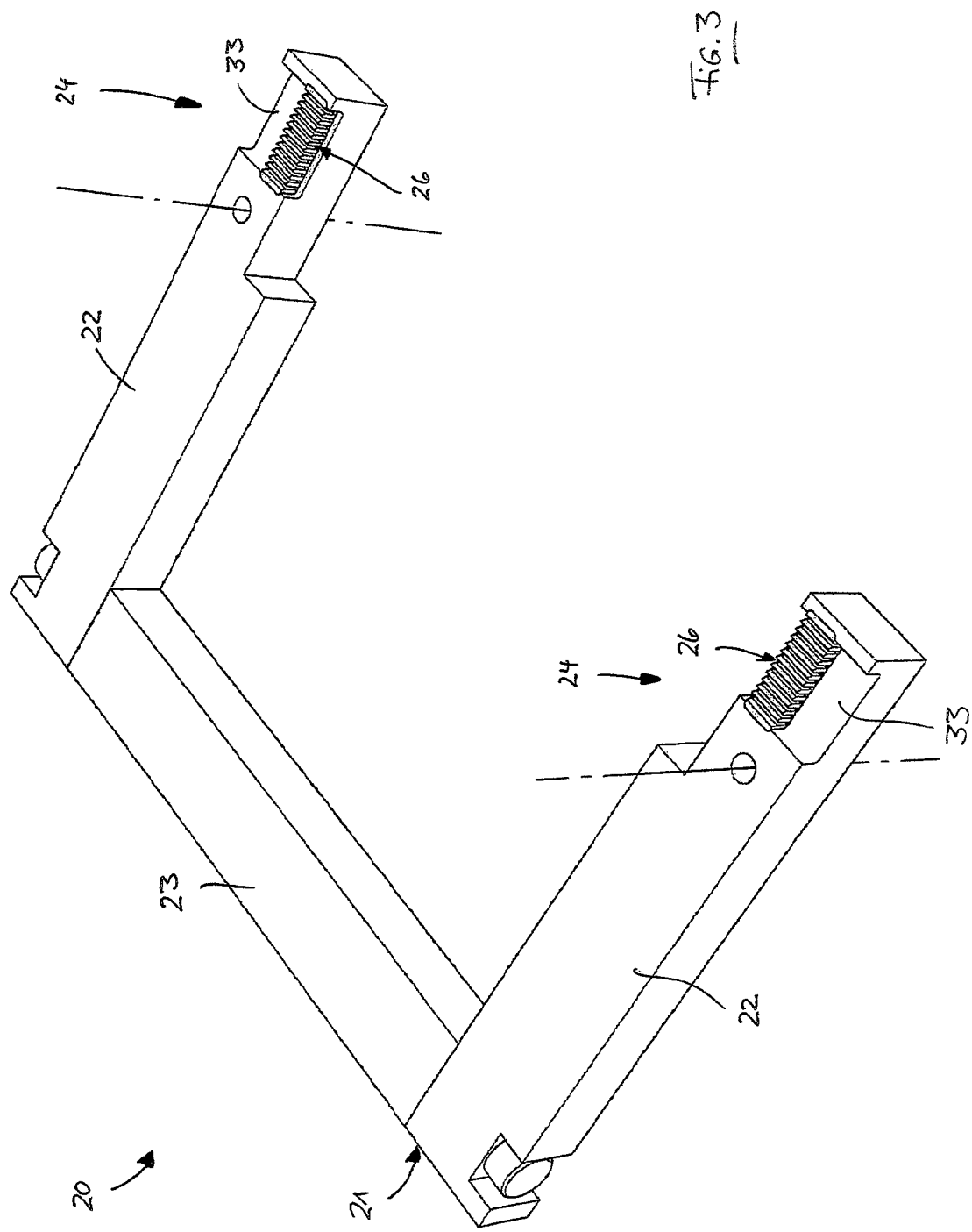
FIG. 3 is an opened, empty holding cassette.
Figure 4:
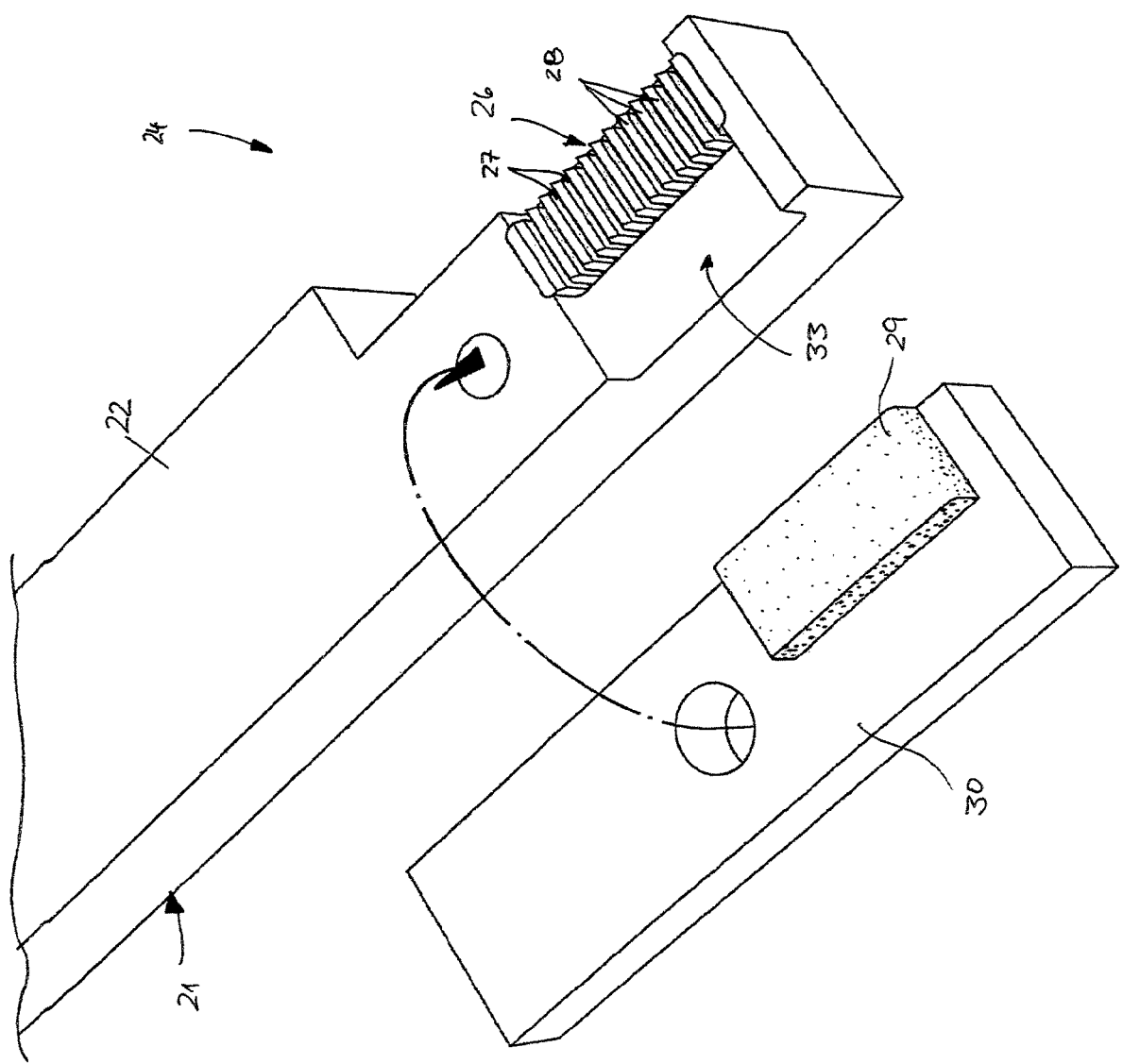
FIG. 4 is a perspective view of an opened holding device of the holding cassette.
Figure 5:
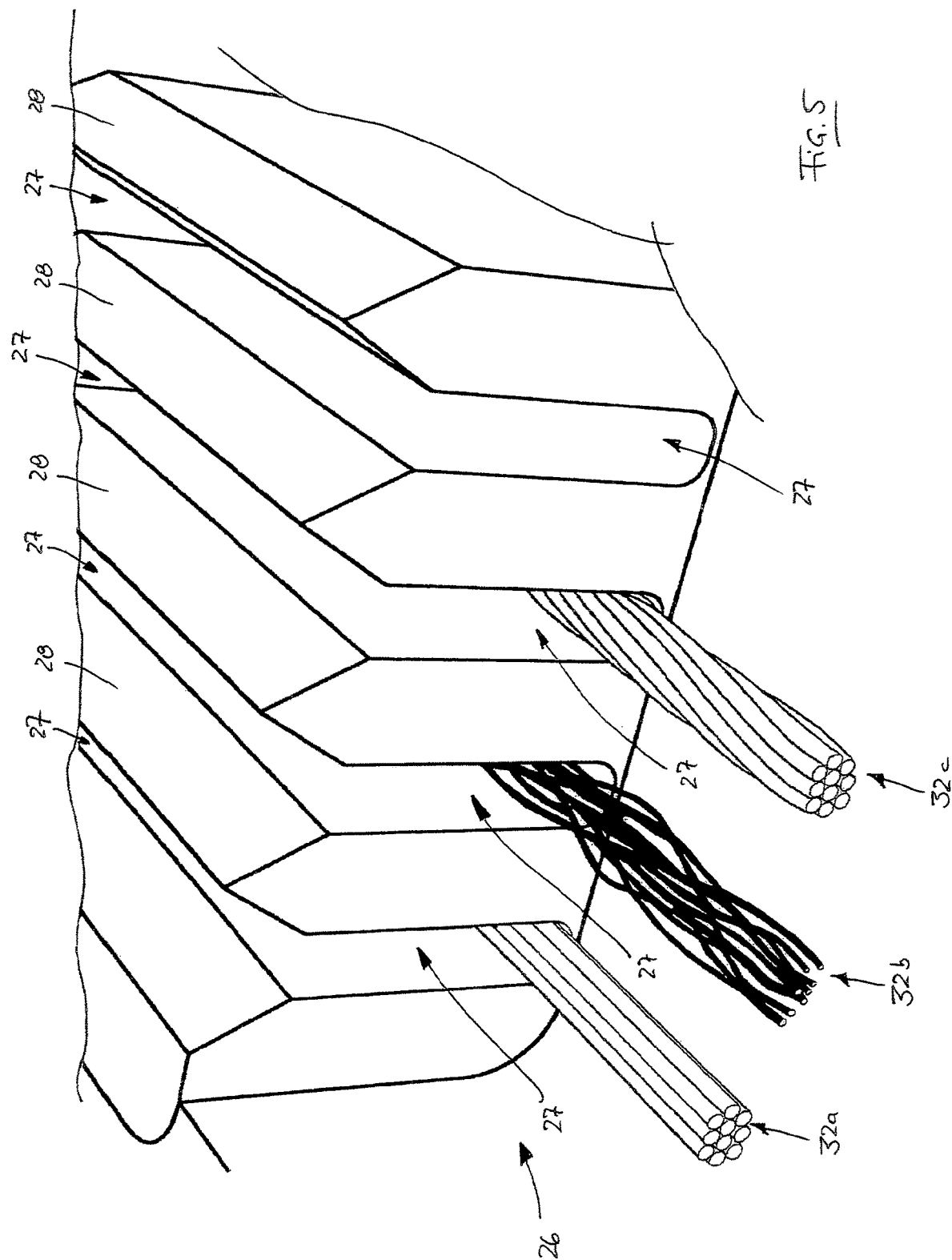
FIG. 5 is a guiding part with a plurality of different filament strands inserted.

As especially FIGS. 3 and 4 show, each holding device 24 comprises a guiding part 26, which has a comb-like or rake-like configuration and has a plurality of guide lamellae 28 arranged next to one another, between each of which a guide slot 27 is formed. A filament strand 32 can be inserted into each guide slot 27, so that the filament strands 32 are positioned and held spaced apart in a predefined manner. A clamping surface 33, on which the end sections of the filament strands 32 protruding from the guiding part 26 are supported, is formed at the leg 22 of the frame 21 on the side of the guiding part 26 facing away from the other guiding part 26. The clamping surface 33 interacts with a holding strip 30, which has on its bottom side a preferably pad-like clamping part 29, which is adapted in its dimensions to the dimensions of the clamping surface 33. The holding strip 30 may thus be placed onto the leg 22 of the frame 21 and be clamped tightly by means of a clamping device, for example, in the form of a tensioning screw 31, so that the filament strands 32 are clamped tightly between the clamping surface 33 and the clamping part 29, as it is shown in FIG. 2. In this way, the filament strands 32 are held in a non-positive manner in their end areas and freely span over the distance between the legs 22.

Figure 6:
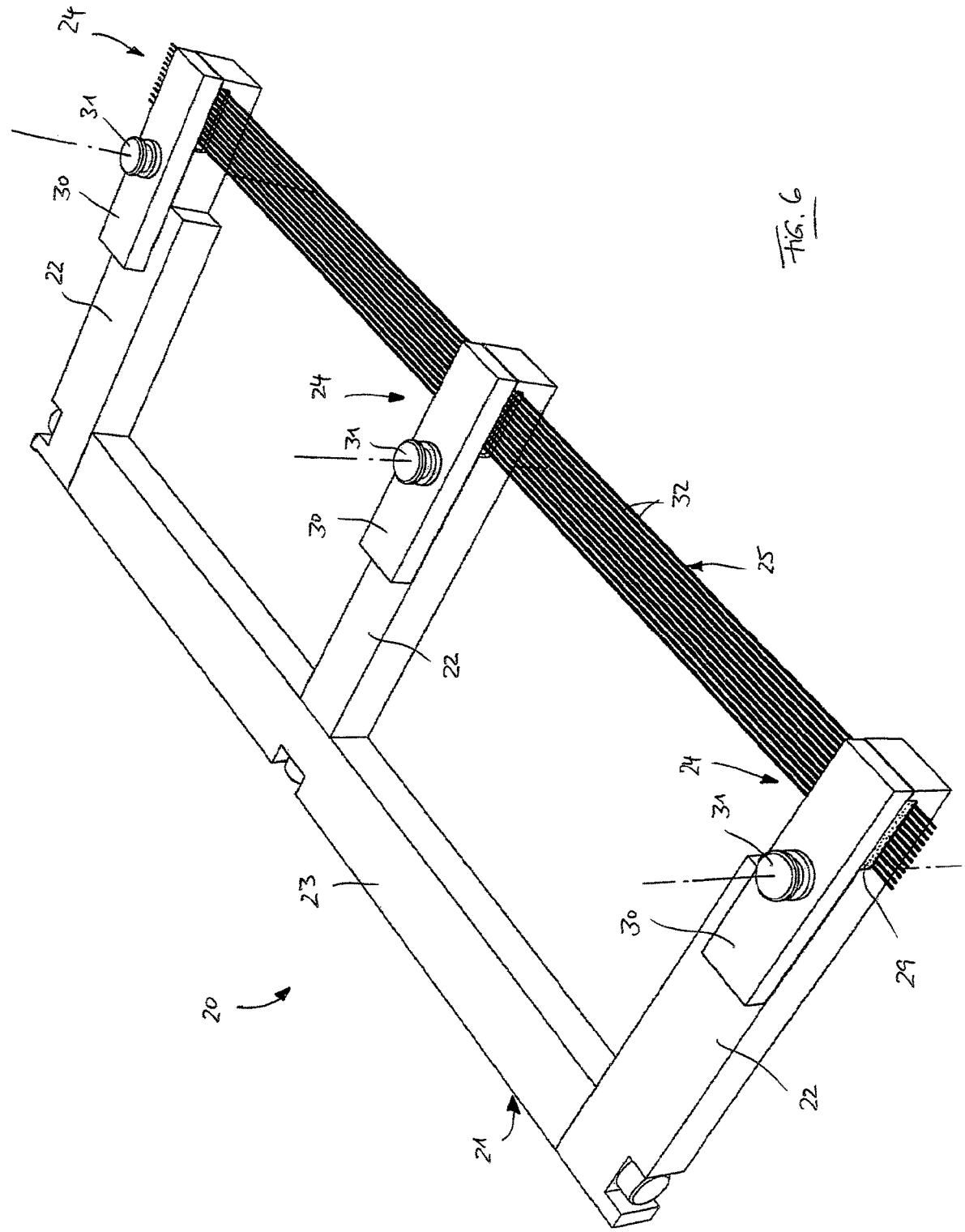
FIG. 6 is a perspective view of a modified embodiment of the holding cassette.

FIG. 6 shows a variant of the holding cassette 20 according to FIG. 2, wherein the frame 21 now has an E-shaped configuration, i.e., has an additional middle leg 22, so that the filament strands 32 are positioned in the described manner and held by clamping by means of a holding device 24 not only in their end areas but also in their middle area.

Figure 7:
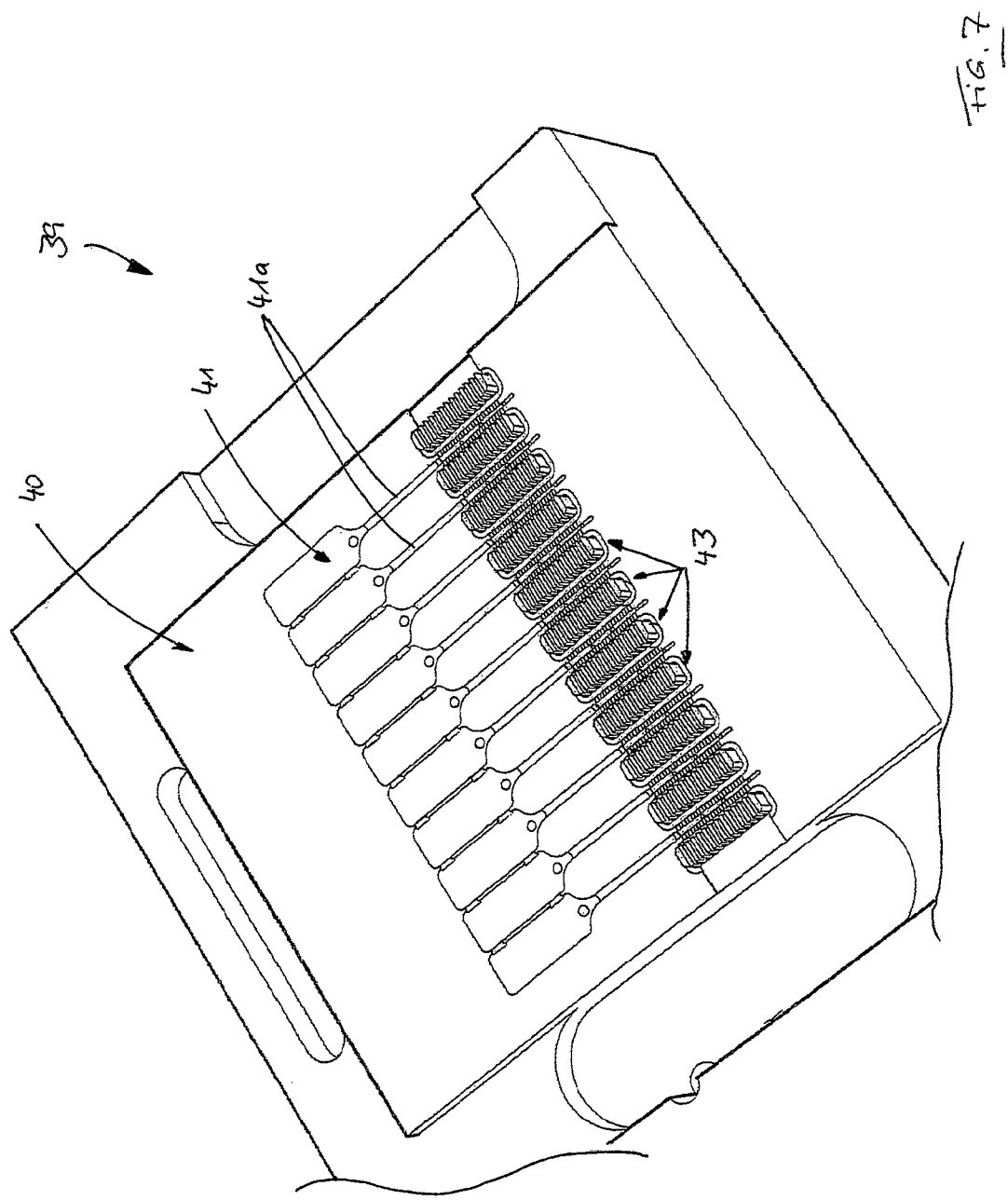
FIG. 7 is a perspective view of an opened injection-molding device without holding cassette.
Figure 8:
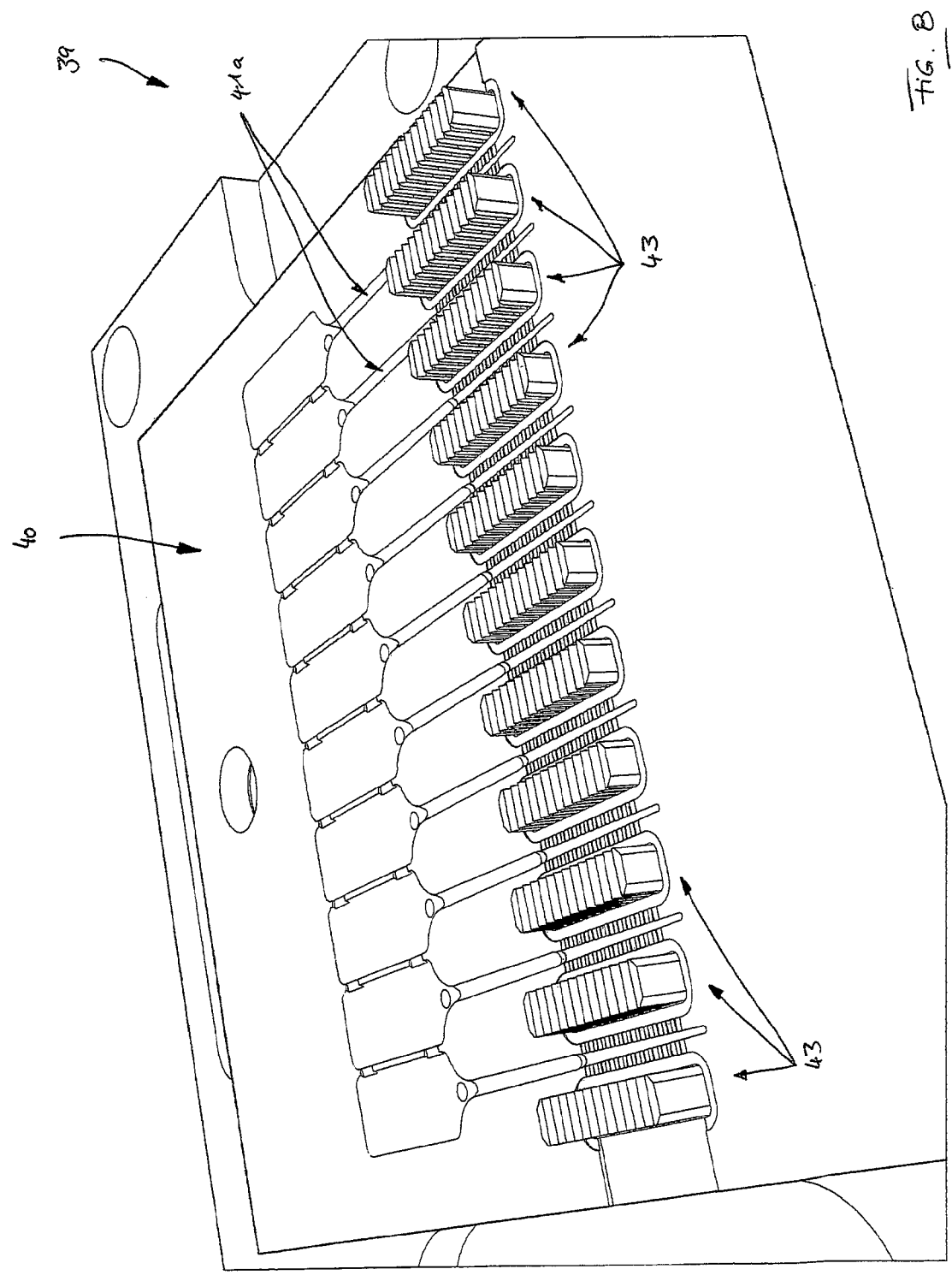
FIG. 8 is a perspective view of an opened injection-molding device without holding cassette with a special embodiment of the first positioning parts.

FIG. 7 shows an opened injection-molding device 39 with a mold part 40 and with a mold half, in which a cavity 41 corresponding to the shape of ten interdental cleaners 11 arranged next to one another is formed. The cavity 41 also comprises ten cavity sections 41a, which are each used for the formation of the rod-shaped carrier 12. In the area of the front end of the cavity sections 41a, first positioning parts 43 are arranged between each of the cavity sections 41a and additionally laterally next to each of the outer cavity sections 41a. While all the first positioning parts 43 have the same height (measured in the direction of insertion and thus essentially at right angles to the drawing plane according to FIG. 7) in the embodiment according to FIG. 7, FIG. 8 shows a variant thereof, some of the first positioning parts 43 having different heights. In the exemplary embodiments shown, the highest first positioning parts are each arranged at the end of the row formed by the first positioning parts 43. The height of the first positioning parts 43 decreases towards the middle of the row, the positioning part 43 with the lowest height being arranged in the middle of the row. The gradation of the heights of the first positioning parts 43 causes the filament strands to be inserted with a temporal offset one after the other into the first positioning slots 44 of the first positioning parts 43 when the holding cassette is inserted into the injection-molding device, as a result of which the risk of incorrectly inserted filament strands is reduced or even avoided.

Figure 9:
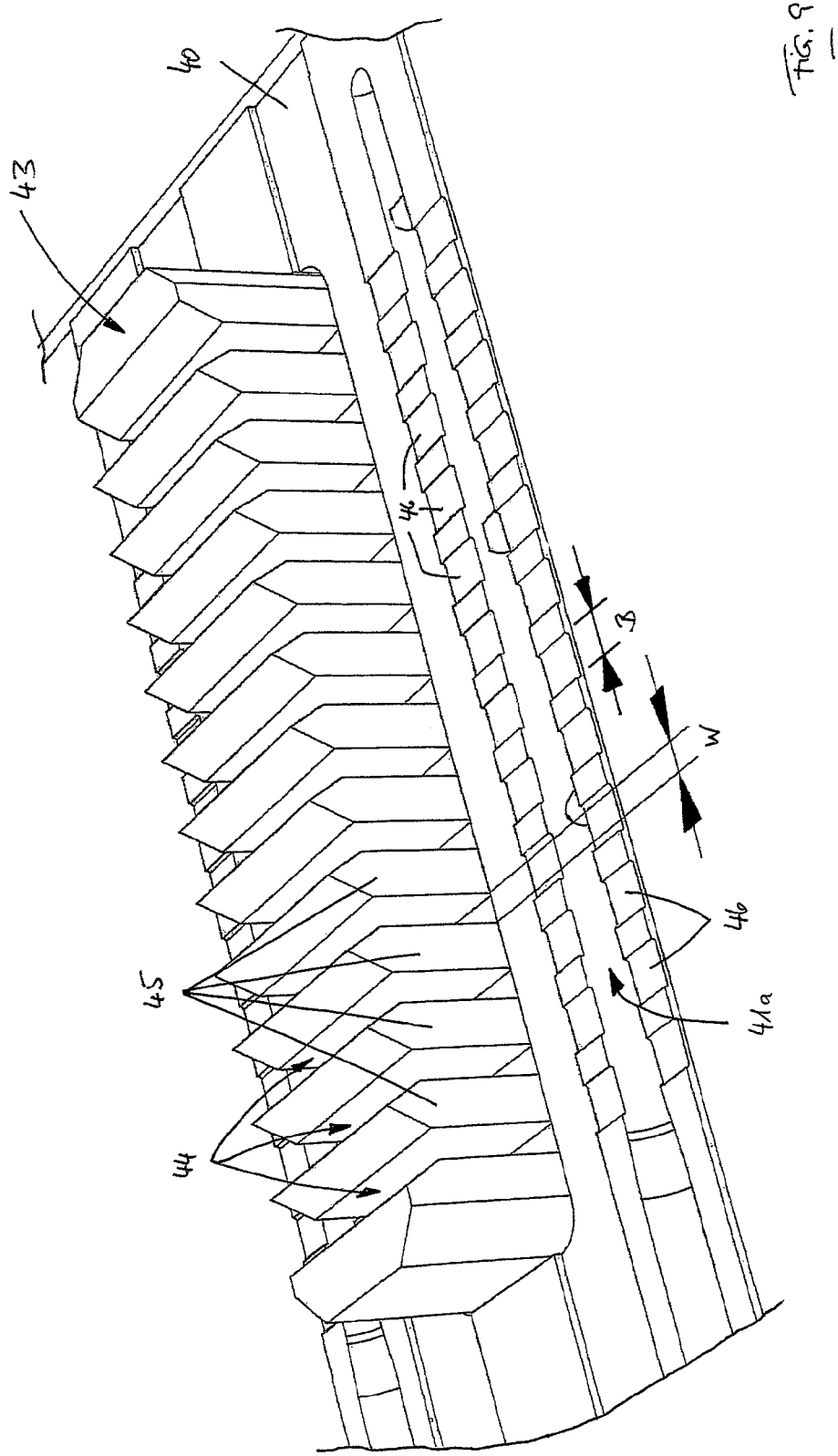
FIG. 9 is an enlarged perspective view of a first positioning part.

One of the first positioning parts 43 is shown in an enlarged manner in FIG. 9. Each first positioning part 43 has a rake-like or comb-like configuration and has first positioning lamellae 45, which are arranged at a mutual distance and form between each of them first positioning slots 44, which run at right angles to the longitudinal extension of the cavity sections 41a and of the rod-shaped carriers 12. The width of the first positioning slots 44 is designated by W in FIG. 8.

Depressions 46 are formed in the mold part 40 directly next to the cavity sections 41a for the rod-shaped carriers 12. Two depressions 46 each formed on opposite sides of a cavity section 41a are flush with one another and are, in addition, aligned with the adjacent first positioning slots 44 of the first positioning parts 43. The breadth of the depressions 46 measured in the longitudinal direction of the cavity sections 41a and parallel to the width W of the first positioning slots 44 is designated by B in FIG. 9. In this case, the breadth B of the depressions is 10% to 30% greater than the width W of the first positioning slots.

Figure 10:
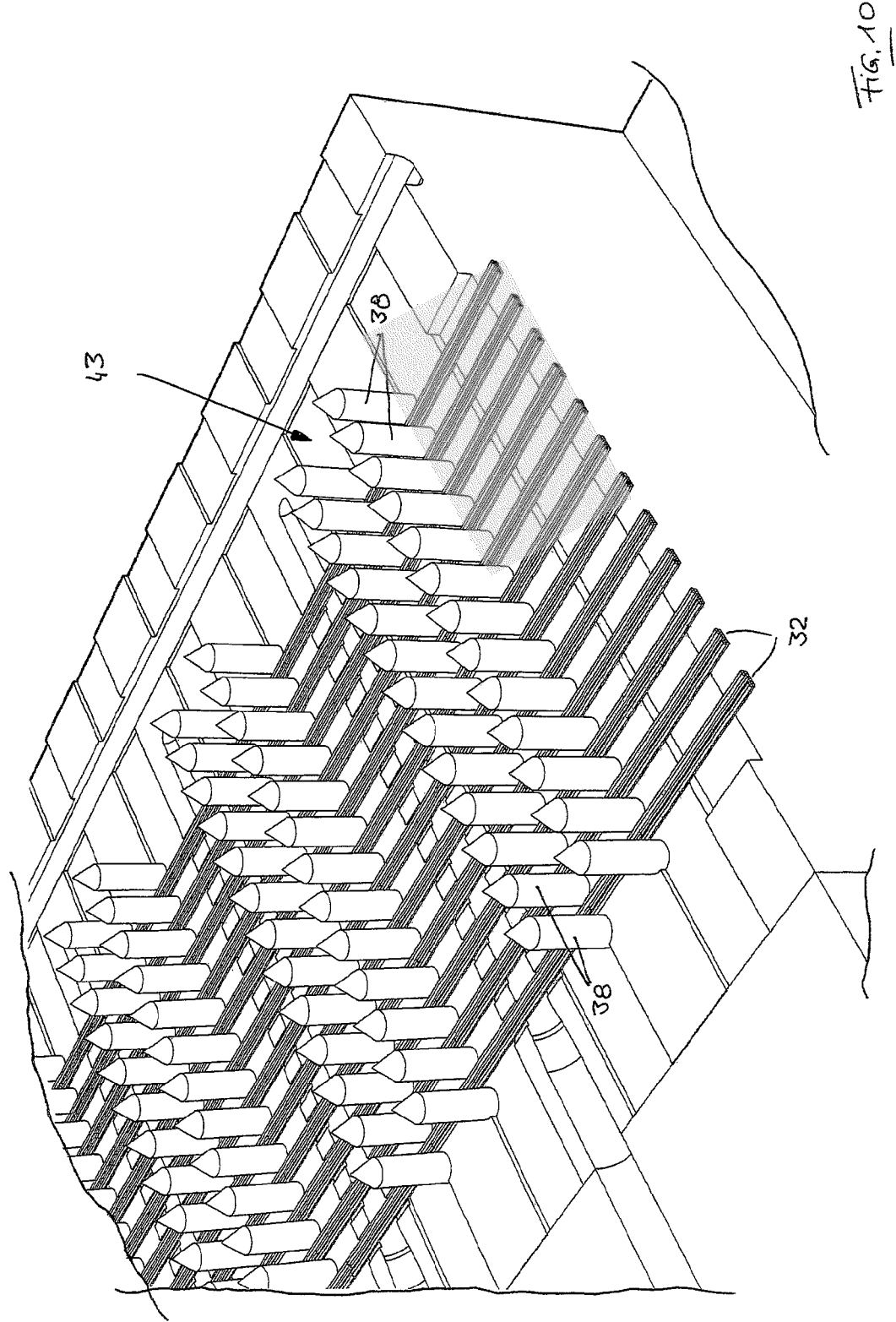
FIG. 10 is a first alternative embodiment of a first positioning part.
Figure 11:
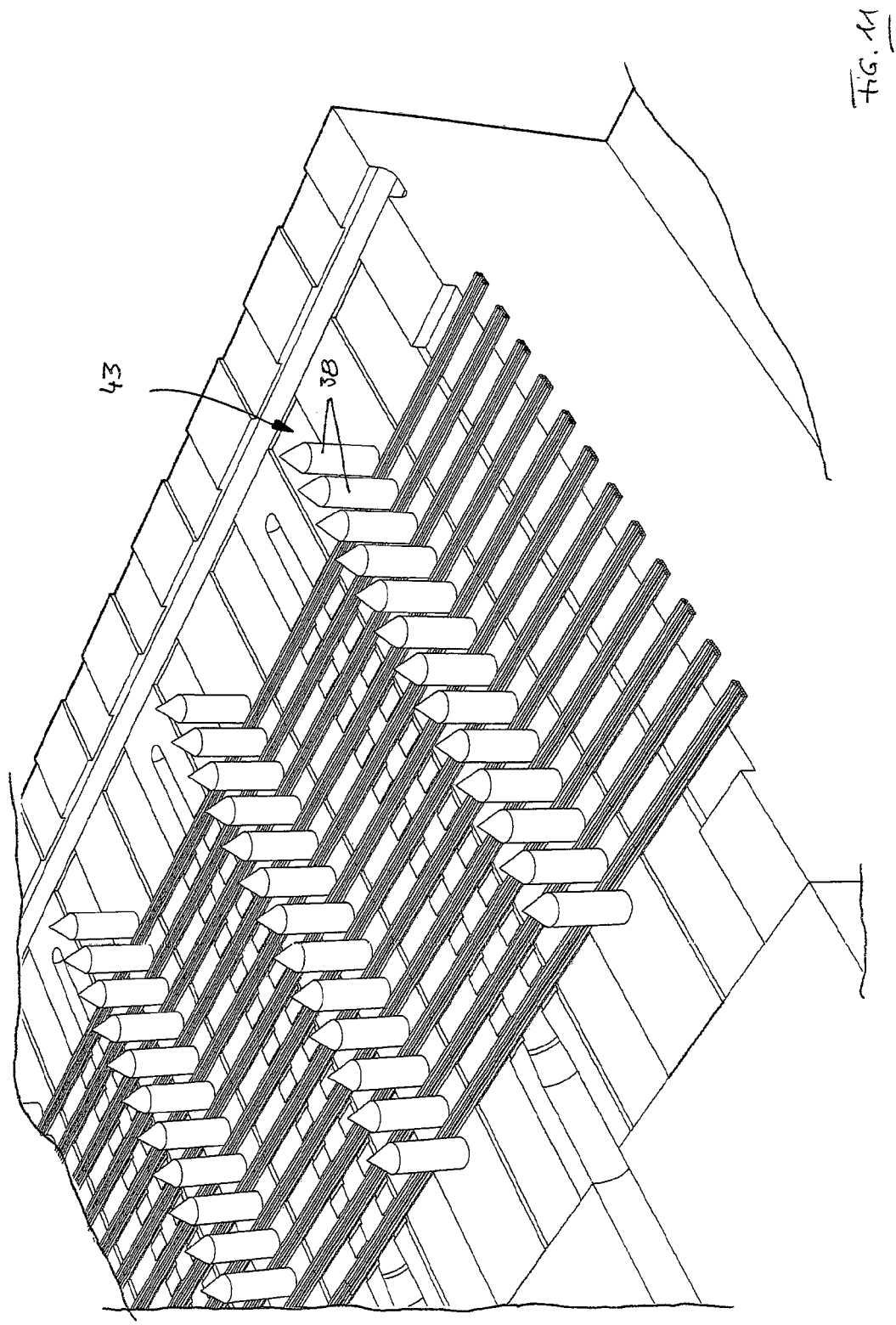
FIG. 11 is a second alternative embodiment of a first positioning part.
Figure 12:
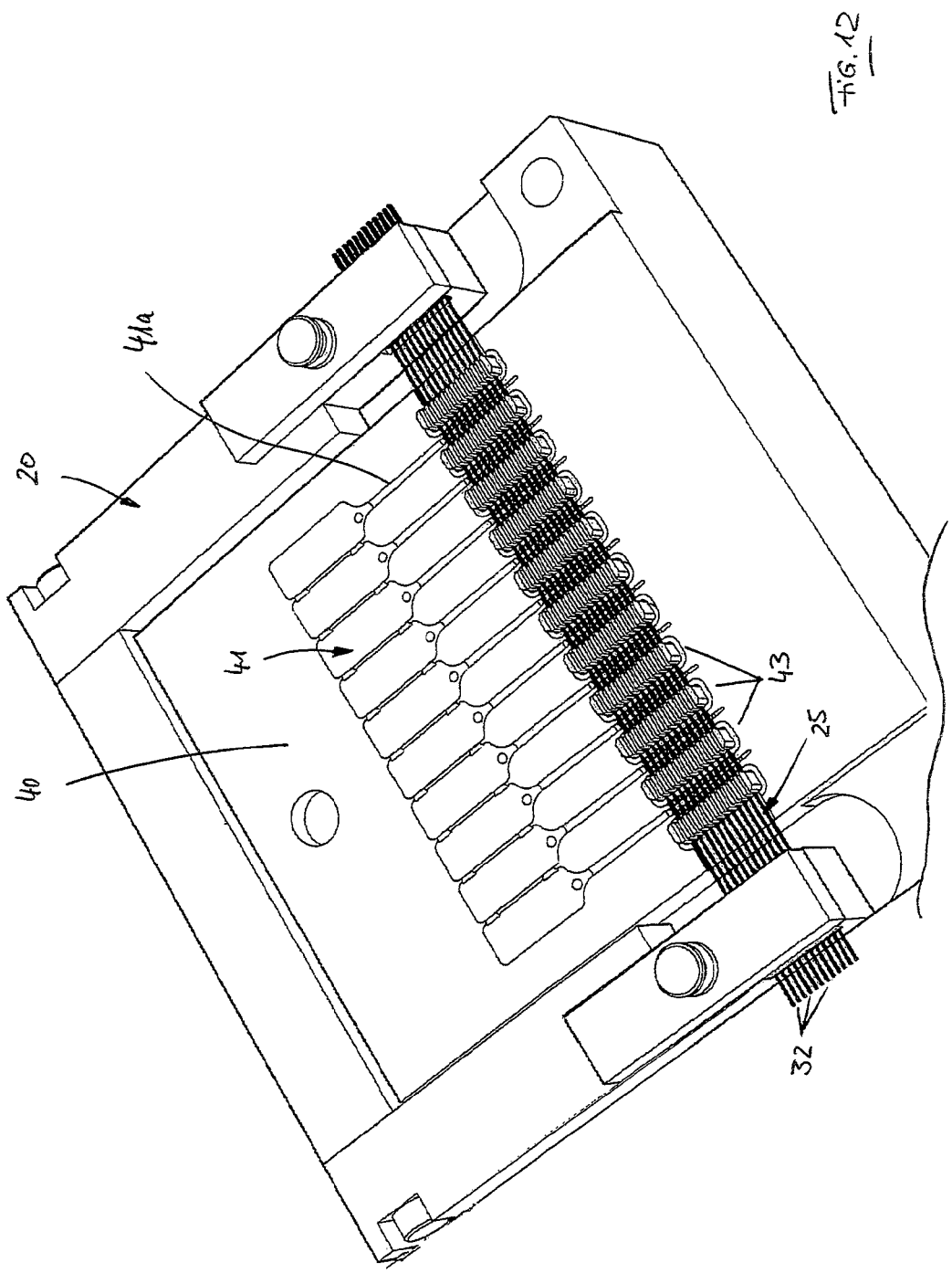
FIG. 12 is the injection-molding device from FIG. 7 with inserted holding cassette.

FIG. 10 shows an alternative embodiment of the first positioning parts, wherein these parts have, furthermore, a comb-like or rake-like configuration, but do not comprise any positioning lamellae, but rather two rows, arranged parallel next to one another, of similar first positioning pins 38 which taper conically upwards and are arranged spaced apart. According to FIG. 11, an additional variant is provided, wherein the first positioning parts 43 are each formed only by a single row of corresponding positioning pins 38 arranged spaced apart.

Figure 13:
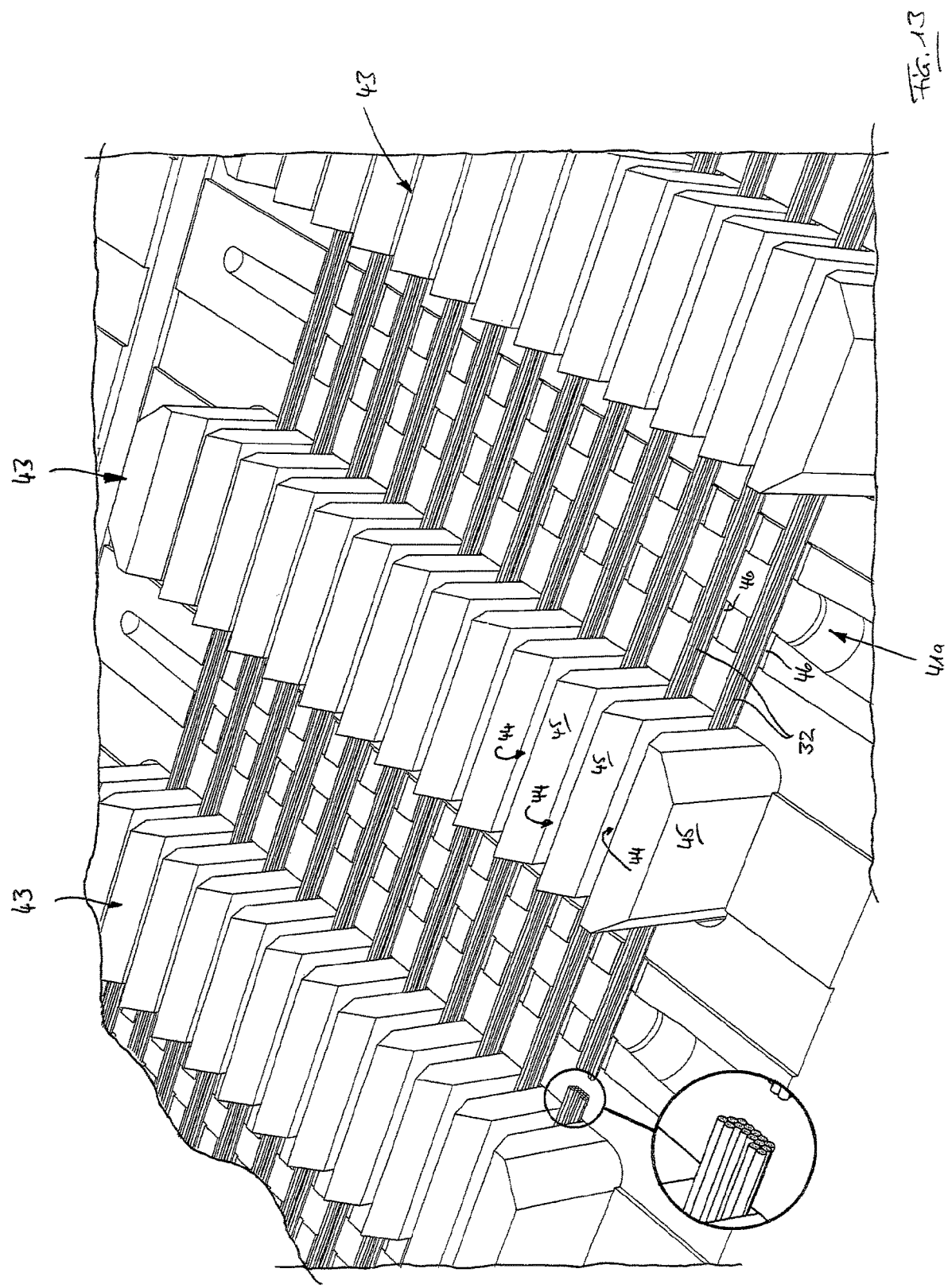
FIG. 13 is an enlarged perspective view of a first positioning part with inserted filament strands before the closing of the injection-molding device.
Figure 14:
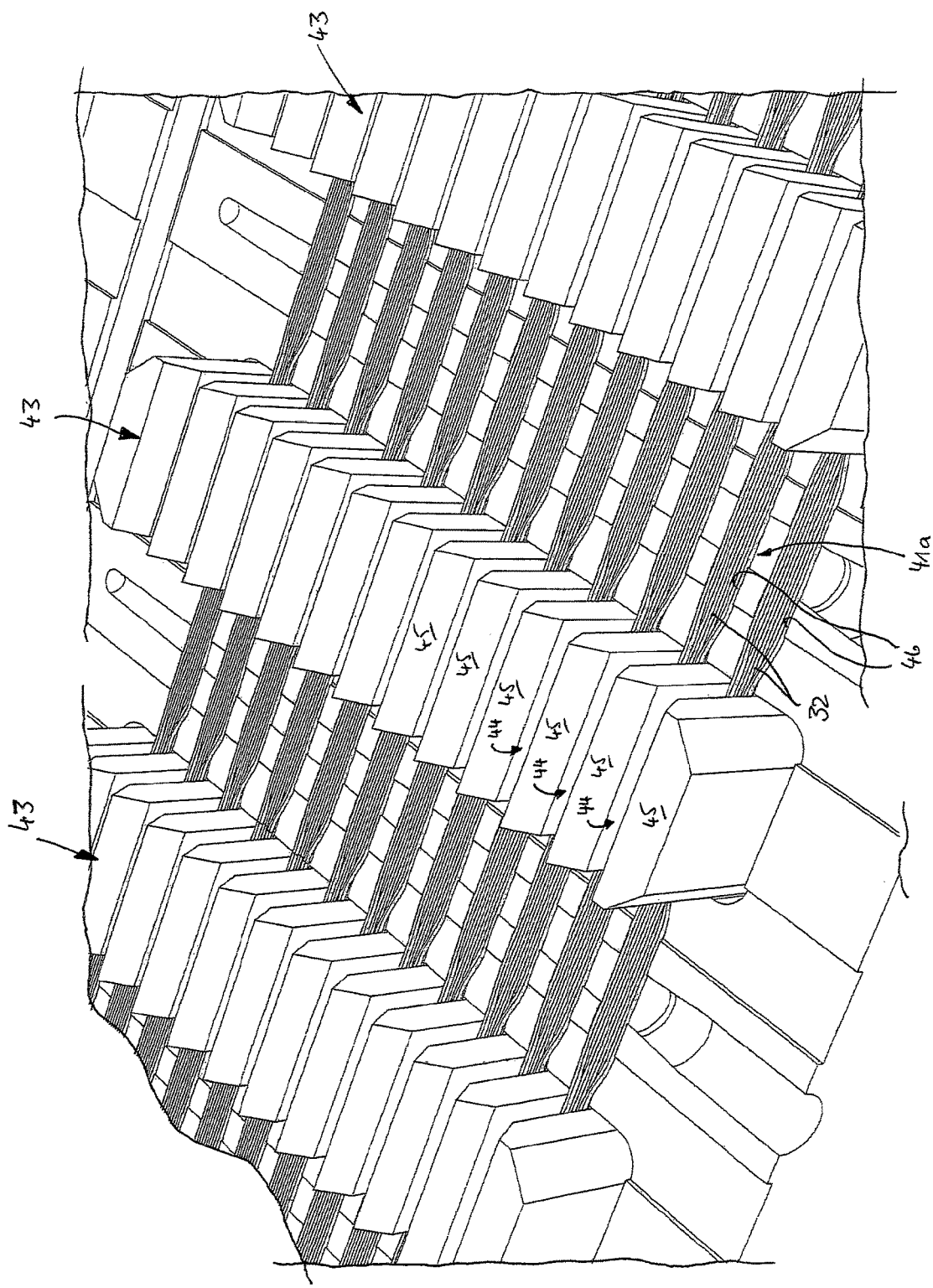
FIG. 14 is the view according to FIG. 13 after the closing of the injection-molding device.

The holding cassette 20 fitted with the filament array 25 is inserted from above into the mold part 40 of the injection-molding device 39. In this case, the filament strands 32 are each threaded into one of the first positioning slots 44 of each first positioning part 43 and, in addition, are deposited into the depressions 46 of the mold part 40. This state is shown in FIG. 13, wherein it can be seen that, in their originally loosely clamped section between the two holding devices 24 of the holding cassette 20, the filament strands 32 is now held spaced apart by means of first positioning parts 43 additionally on both sides of each cavity section 41a. The file view in FIG. 13 shows that the filament strands 32 in this state have a multilayer configuration consisting of the individual filaments and are not yet completely distributed over their breadth even in the area of the depressions 46. This occurs when the injection-molding device 39 is closed. This state is shown in FIG. 14, the corresponding mold part of the injection-molding device being omitted for the sake of clarity. When the injection-molding device is closed, a force of pressure at right angles to the longitudinal extension of the filaments is exerted on each filament strand 32, as a result of which the filaments are distributed in the depressions 46 and are received in the depressions 46 with a tight fit as well as a tight packing. As a result, not only is a precise positioning of the filaments obtained, but it is additionally achieved that the plastic material injected into the cavity sections 41a cannot be released in the area of the depressions 46 and of the filament strands 32.

Since the breadth B of the depressions 46 is greater than the width W of the first positioning slots 44, the configuration shown in FIG. 14 is obtained in which each filament strand 32 is slightly compressed or pinched and as a result is configured as being higher in that section that runs within a first positioning slot 44, while it is widened in the area between two adjacent first positioning parts 43 and thus in the area spanning over the cavity sections 41a by a greater extent and has a flatter shape in its dimensions due to the broader depressions 46, as it is shown in FIG. 14.

Figure 15:
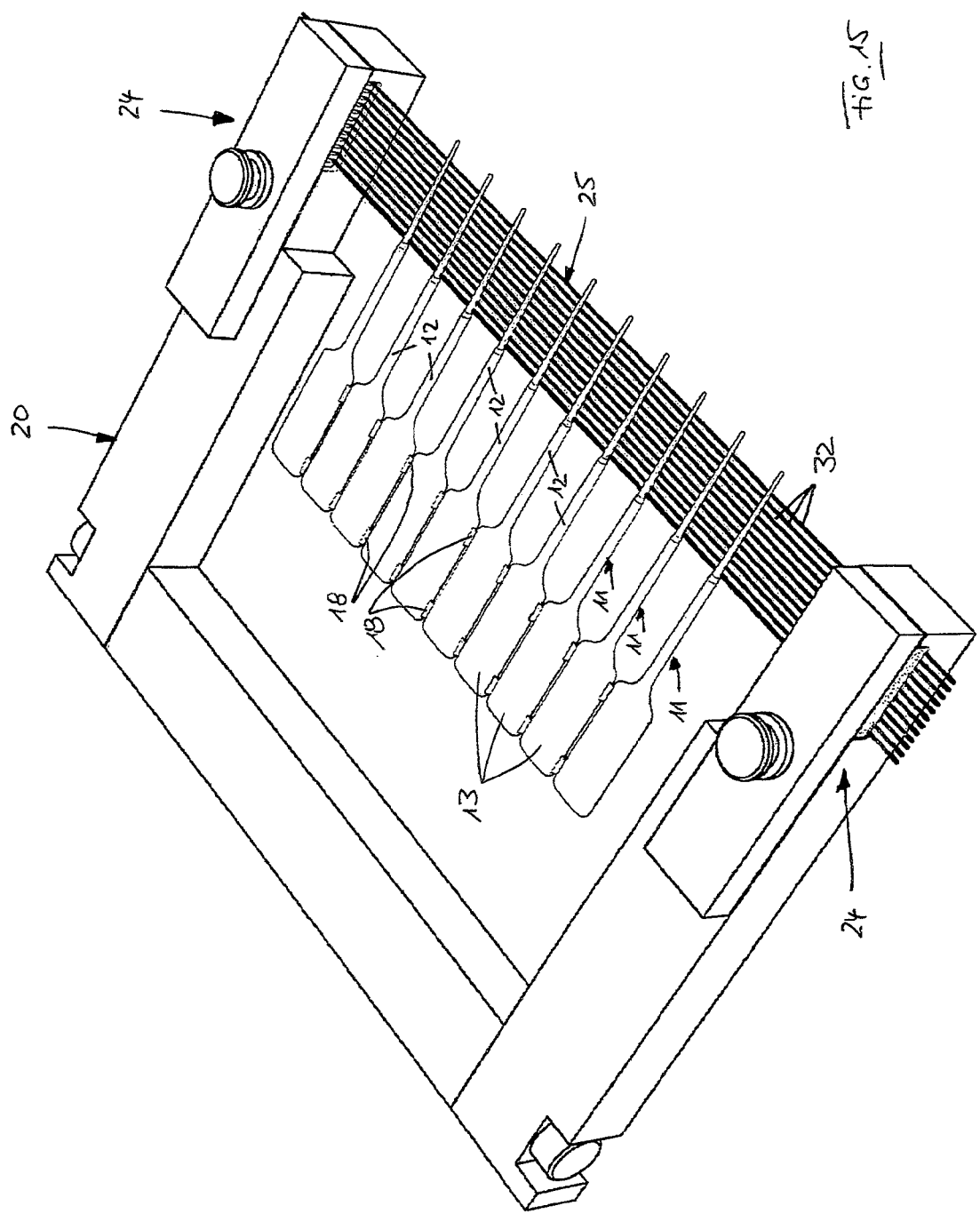
FIG. 15 is a perspective view of a holding cassette with molded-on carriers.

After the insertion of the holding cassette 20 fitted with the filament strands 32 into the injection-molding device 39, this device is closed in the usual manner and a liquid plastic, which forms the rod-shaped carriers 12, the grip sections 13 and the webs 18 connecting the grip sections 13, is injected into the cavity 41. The filament strands 32 are embedded into the plastic material of the rod-shaped carriers 12 and thus penetrate the rod-shaped carriers 12. After opening the injection-molding device 39, the holding cassette 20 is removed, in which ten interdental cleaners 11, which are connected to one another in their grip sections 13 via the webs 18, are then molded onto the filament array 25. This state is shown in FIG. 15.

When it is desired to overinject the front sections of the rod-shaped carriers 12 with the cover 16 made of a soft elastic plastic, for example, a thermoplastic elastomer, corresponding covers 16 are molded onto the rod-shaped carriers 12 in a subsequent method step. This may take place either in the same injection-molding device 39, but in a different or adjusted mold part, or in an additional injection-molding device 47. In the present case, it shall, for example, be assumed that an additional injection-molding device 47 is provided, as it is shown in FIG. 16. This device has a cavity 50 for encapsulating by injection molding corresponding to the shape of the ten covers 16 to be molded on. In addition, the additional injection-molding device 47 has a plurality of second positioning parts 48, which have a comb-like or rake-like configuration corresponding to the first positioning parts 43 of the injection-molding device 39, wherein the filament array 25 with the ten rod-shaped carriers 12 is positioned in the extrusion-coating cavity 50 in such a way that each filament strand 32 is threaded in and as a result is always positioned in a second positioning slot 49 of the second positioning parts 48, which slot is formed between second positioning lamellae 52. This state is shown in FIG. 16.

The structural configuration of the second positioning parts 48 corresponds to the structural configuration of the first positioning parts 43, to which reference shall be made for the purpose of avoiding repetitions.

After the holding cassette 20 with the filament array 25 and the rod-shaped carriers 12 held thereon is inserted into the cavity 50 for encapsulating by injection molding and into the additional injection-molding device 47, this device is closed, and the soft elastic plastic is injected, which provides each of the rod-shaped carriers 12 of each interdental cleaner 11 with a front-side cover 16, which has fingers radially on the outside.

After opening the additional injection-molding device 47, the holding cassette 20 is removed. This state is shown in FIG. 17. Here, all interdental cleaners 11 are still connected to one another both via the webs 18 in the area of their grip sections 13 and via the filament strands 32 in the area of their cleaning sections 14.

Subsequently, the holding devices 24, which clamp the filament array 25 in the holding cassette 20, are opened (see FIG. 18) and the set 10 consisting of ten interdental cleaners 11 and the filament array 25 is removed and fed to a cutting station, which is only suggested in FIG. 19. In the cutting station, each rod-shaped carrier 12 is cut out of the filament array 25 in the area of its cleaning section 14 by two cuts S1 and S2 running on different sides, which merge at an acute angle in the direction of the front end of the interdental cleaner 11. The cleaning section 14 of the interdental cleaner 11 with a bristle border consisting of bristles 15 protruding on opposite sides and with a cover 16 with radially protruding fingers 17 already explained in connection with FIG. 1 is thus obtained. The interdental cleaners 11 are still connected to one another via the webs 18 and form the set 10 shown in FIG. 1.

The features of the present invention disclosed in the above description, the claims and the drawings may be relevant both alone and in any desired combination for the implementation of the present invention in its various embodiments. While specific embodiments of the invention have been shown and described in detail to illustrate the application of the principles of the invention, it will be understood that the invention may be embodied otherwise without departing from such principles.

The invention claimed is:

1. A device for manufacturing interdental cleaners, each of which comprises a rod-shaped carrier made of plastic into which laterally protruding bristles are embedded, the device comprising:
   an injection molding device; and
   a holding device for holding a filament array formed of a plurality of filament strands, wherein:
   the holding device has a holding cassette configured as a frame and with at least two guiding parts located spaced apart from one another,
   the filament strands are configured to be inserted into the at least two guiding parts,
   the filament strands are configured to be fixed in the holding cassette such that the filament strands freely span a distance between the guiding parts,
   the holding cassette is configured to be inserted into the injection-molding device while fitted with the filament strands inserted into the at least two guiding parts and to be removed from the injection-molding device with the filament strands being embedded in injection molded plastic material of a plurality of the rod-shaped carriers,
   the injection molding device has at least one cavity for forming a plurality of the rod-shaped carriers arranged next to one another,
   the injection molding device has a plurality of comb-like first positioning parts spaced apart from each other,
   the first positioning parts are configured to guide the filament strands into the injection molding device when the holding cassette with the filament strands fitted therein is being inserted into the injection molding device,
   the at least one cavity has a plurality of cavity sections configured to form a respective one of the rod-shaped carriers,
   a plurality of groove like depressions is formed between each of the cavity sections and a respective one of the first positioning parts,
   each of the plurality of depressions is configured to receive one of the filament strands guided therein by the first positioning parts, and
   respective ones of the depressions formed on opposite sides of the cavity sections are flush with one another and are aligned with adjacent ones of the first positioning parts.

2. A device in accordance with claim 1, wherein the guiding parts comprise a plurality of guide slots arranged next to one another.

3. A device in accordance with claim 2, wherein each of the guide slots is configured to receive exactly one of the filament strands.

4. A device in accordance with claim 1, wherein the holding cassette has a clamping part for clamping the filament strands.

5. A device in accordance with claim 1, wherein the holding cassette is configured as a frame comprising a base extending between the guiding parts.

6. A device in accordance with claim 5, wherein the frame has a C-shaped or E-shaped configuration.

7. A device in accordance with claim 1, wherein a positioning device, for positioning and guiding the filament strands into the injection-molding device, comprises the first positioning parts.

8. A device in accordance with claim 7, wherein each of the first positioning parts has a plurality of first positioning slots arranged next to each other.

9. A device in accordance with claim 8, wherein each of the first positioning slots is configured for receiving exactly one of the filament strands.

10. A device in accordance with claim 8, wherein a breadth of the depressions is greater than a width of the first positioning slots.

11. A device in accordance with claim 10, wherein the injection-molding device or an additional injection-molding device has a coating cavity in which the rod-shaped carriers are configured to be coated with a plastic in the area of the filament array, wherein the coating cavity has a plurality of cavity sections for forming a respective cover each from the plastic coating, and wherein a plurality of second, spaced positioning parts of the coating cavity are provided.

12. A device in accordance with claim 11, wherein each of the second positioning parts has a plurality of second positioning slots arranged next to one another.

13. A device in accordance with claim 12, wherein each of the second positioning slots is configured to receive exactly one of the filament strands.

14. A device in accordance with claim 11, wherein at least one of the second positioning parts is provided between two adjacent ones of the cavity sections of the coating cavity.

15. A device in accordance with claim 11, wherein at least some of the second positioning parts have a different height.

16. A device in accordance with claim 7, wherein at least one of the first positioning parts is provided between two adjacent ones of the cavity sections.

17. A device in accordance with claim 7, wherein at least some of the first positioning parts have a different height.

18. A device in accordance with claim 1, wherein a cutting device is provided, by means of which the rod-shaped carriers can be cut out of the filament array.

19. A device in accordance with claim 1, wherein the depressions are formed directly next to the cavity sections.

* * * * *